Figure 1:
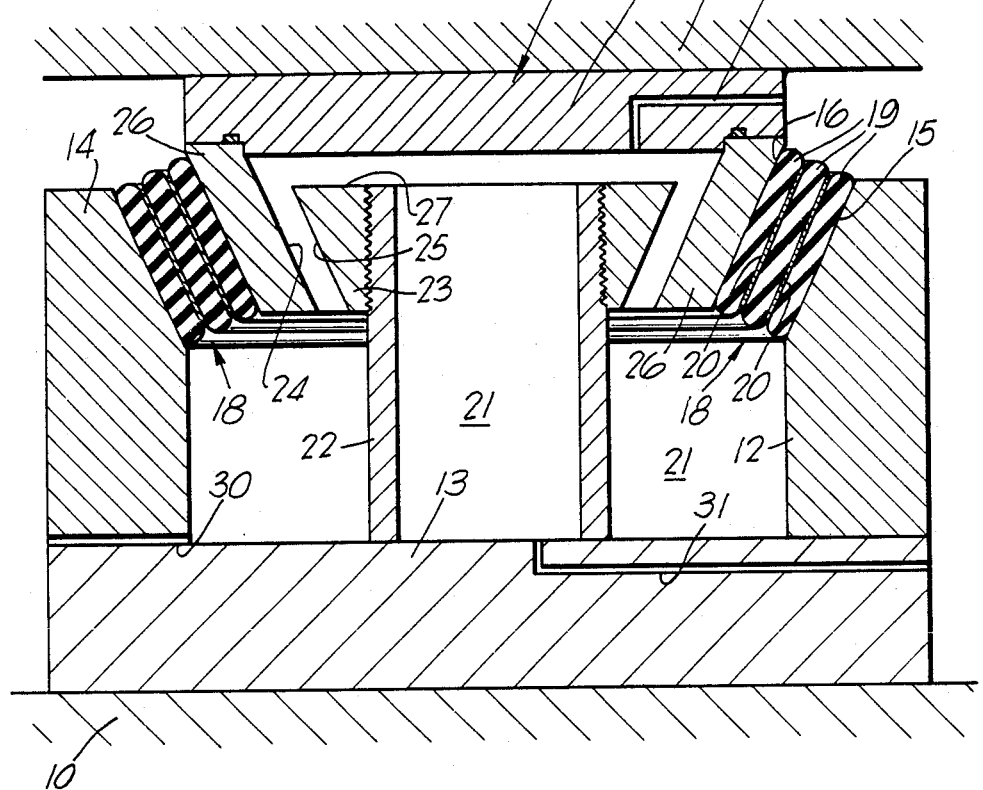

United States Patent [19]

Moore

[11] Patent Number: 4,875,664
[45] Date of Patent: Oct. 24, 1989

[54] VIBRATION ATTENUATION

[75] Inventor: Alan F. Moore, Burbage, England

[73] Assignee: Dunlop Limited a British Company, United Kingdom

[21] Appl. No.: 32,505

[22] Filed: Mar. 31, 1987

[30] Foreign Application Priority Data

Apr. 4, 1986 [GB] United Kingdom ............... 86 08259

[51] Int. Cl.⁴ ............................ F16F 9/08; F16F 9/43
[52] U.S. Cl. ............................... 267/140.1; 267/64.28; 267/141.1; 267/218; 267/219; 248/567
[58] Field of Search ............. 188/269, 322.21, 322.19; 267/218, 220, 35, 259, 294, 64.28, 121, 140.1, 140.5, 141.1, 141.3, 219; 248/562, 636; 180/300, 312

[56] References Cited

U.S. PATENT DOCUMENTS

| 2,496,770 | 2/1950 | Bennett | 267/141.1 |
| 3,282,542 | 11/1966 | Hutchinson et al. | |
| 3,940,098 | 2/1976 | Takasaki et al. | |
| 4,147,319 | 4/1979 | Tsybulnik et al. | |
| 4,632,370 | 12/1986 | Ticks et al. | 267/356 X |
| 4,653,734 | 3/1987 | Jordens | 267/219 |
| 4,679,759 | 7/1987 | Ford | 248/562 |
| 4,688,776 | 8/1987 | Lecour et al. | 267/140.1 |
| 4,770,396 | 9/1988 | Jouade | 267/219 X |

FOREIGN PATENT DOCUMENTS

| 0698953 | 10/1953 | United Kingdom | 267/35 |
| 0961705 | 6/1964 | United Kingdom | 267/35 |
| 0124427 | 11/1984 | European Pat. Off. | 267/140.1 |
| 2327310 | 1/1974 | Fed. Rep. of Germany . | |
| 1150957 | 1/1958 | France | 267/35 |
| 2117240 | 7/1972 | France . | |
| 2274833 | 1/1976 | France . | |
| 60-164520 | 8/1985 | Japan . | |
| 1099142 | 6/1984 | U.S.S.R. | 267/64.28 |
| 500004 | 2/1933 | United Kingdom . | |
| 698953 | 1/1951 | United Kingdom . | |
| 786371 | 12/1952 | United Kingdom . | |
| 1046694 | 3/1964 | United Kingdom . | |
| 1267637 | 3/1972 | United Kingdom . | |
| 1449830 | 9/1973 | United Kingdom . | |
| 1496546 | 12/1979 | United Kingdom . | |
| 2033534 | 5/1980 | United Kingdom . | |
| 2087512 | 10/1981 | United Kingdom . | |

OTHER PUBLICATIONS

French Search Report.

Primary Examiner—Andres Kashnikow
Assistant Examiner—Richard Potosnak
Attorney, Agent, or Firm—Stevens, Davis, Miller & Mosher

[57] ABSTRACT

For use, for example, in mounting a personnel accommodation module on an offshore drilling rig to attenuate the transmission of vibration use is made of an anti-vibration mounting comprising a rigid fluid container having an opening, a rigid support member for closing at least a part of that opening, a flexible seal comprising at least one element of elastomeric material arranged to extend between confronting surfaces of the fluid container and rigid support member thereby to form a fluid chamber within the anti-vibration mounting, liquid supply passage for the flow of liquid to and from that chamber, and gas supply passage for the flow of gas to and from that chamber, the liquid and gas supply passage being independent of one another whereby the quantities of liquid and gas within the chamber may be varied independently by flow through the passage.

12 Claims, 1 Drawing Sheet

U.S. Patent  Oct. 24, 1989  4,875,664

VIBRATION ATTENUATION

This invention relates to an anti-vibration mounting and in particular, though not exclusively, to an anti-vibration mounting suitable for the mounting of a module such as a personnel accommodation unit on a vibration contaminated structure such as that of an offshore drilling rig to attenuate the transmission of vibration from the structure to the module.

In structures such as offshore drilling rigs which support a combination of vibration generating equipment and personnel accommodation modules it is not feasible to resiliently mount all equipment such that the support structure is sufficiently free of vibration to allow personnel accommodation modules to be mounted directly to said support structure.

To avoid the undue transmission of vibration to personnel accommodation or other load modules it has been the practice to mount the modules resiliently by means of a set of mountings, say four mountings disposed one under each corner region of the module. The conventionally employed mountings each comprise an interleaved stack of flat metal plates and layers of elastomeric material. These mountings are oriented such that in normal use the metal plates and elastomeric layers lie generally in a horizontal plane. Thus the elastomeric material is loaded in compression and the metal plates are provided to ensure that the elastomeric material has a greater and thus sufficient compression resisting ability than if a single element of elastomeric material were provided.

While mountings of the aforedescribed kind provide some measure of vibration isolation for a load module, the ability to isolate certain frequency ranges of structure transmitted vibrations is not as good as would be preferred especially in respect of personnel accommodation modules. In particular, it is desired to provide a better suppression of high frequency vibrations than hitherto has been attainable. It is desirable also to be able to change the vibration isolation characteristics in response to changes of the operating environment at least so far as those changes concern externally applied forces or movement experienced directly by the support structure.

In accordance with one aspect of the present invention an anti-vibration mounting comprises:
a rigid fluid container having an opening;
a rigid support member for closing at least a part of said opening;
flexible seal means comprising at least one element of elastomeric material arranged to extend between confronting surfaces of the fluid container and rigid support member thereby to form a fluid chamber within the anti-vibration mounting;
liquid supply means for the flow of liquid to and from said chamber, and gas supply means for the flow of gas to and from said chamber;
said liquid and gas supply means being independent of one another whereby the quantities of liquid and gas within the chamber may be varied independently by flow through said supply means.

The provision of said independent gas and liquid supply means facilitates varying the proportions of gas and liquid within the fluid chamber and there is thereby achieved control of the stiffness and thus anti-vibration properties of the mounting. Furthermore, in use of the mounting these properties may be selectively varied having regard to specific and possibly changing operating and installation conditions.

Preferably the rigid support member is disposed at a vertically upper or lower region of the chamber and preferably said gas and liquid supply means are located one each in the container and rigid support member.

The flexible seal means comprised by said at least one element of elastomeric material may be orientated such that loads applied to the anti-vibration mounting in the normal direction of compression loading thereof result primarily only in compression loading of the elastomeric material, or a combination of compression and shear loadings.

Preferably said at least one element of elastomeric material is bonded between the confronting surfaces of the fluid container and rigid support member. It may be bonded directly to the rigid support member and/or container or may be secured in position indirectly by being bonded to a substantially rigid element such as a metal disc which in turn is secured to the rigid support member or container.

Where the orientation of a layer of said elastomeric material is such that in normal use it is loaded primarily only in compression, i.e. disposed with the layer lying in a generally horizontal plane, resilient buffer means may be provided to restrict higher amplitude horizontal movement. The resilient buffer means may be provided by resilient bushes engaged by one of the fluid container and rigid support member at least when a predetermined amplitude of relative movement has been exceeded.

To facilitate the ability to withstand normally vertically and normally sideways applied loads in a single mounting of unitary construction it is preferred that the layer of elastomeric material be inclined between the horizontal and vertical directions when in use. Accordingly the layer of elastomeric material is able to accommodate relative vertical and horizontal movements between the fluid container and rigid support member by a combination of shear and compression loadings.

It is further preferred that there be provided an interleaved arrangement of a plurality of layers of elastomeric material and one or more rigid plates thereby to afford a good compression and shear load capability.

The confronting surfaces to which the flexible seal means is bonded preferably are arranged to extend parallel to one another at least as considered in cross-section of the mounting.

Apart from construction where the layer(s) of elastomeric material is disposed generally horizontally, the vertical compression loads applied to the anti-vibration mounting in use are withstood primarily by the pressure of the fluid in the chamber. To achieve uniform loading of each of a set of anti-vibration mountings provided for the support of a load module, notwithstanding variations in the spacing between the module and support structure at the regions where the mountings are to be located, the quantity of liquid within the chamber may be selectively varied. Similarly, within the load range capability of a particular mounting it is possible to mount a module in a level manner notwithstanding inclination of the underlying support structure.

Preferably fail-safe retention means is provided to prevent undue relative movement between the fluid container and rigid support member under adverse conditions. Said retention means preferably serves to prevent excess movement of the rigid support member away from the fluid container and also to limit strain of the fluid seal means in the event of an undue reduction of pressure within the chamber when in service. Thus when the mounting is used to locate a module to a support structure separation of the module and support structure in adverse conditions is restrained notwithstanding any failure of the fluid seal means or loss of pressure.

The magnitude of the wholly or substantially unrestricted movement permitted by the fail-safe retention means preferably is such that as well as accommodating the vertical movement to be experienced in use due to vibration, it allows a useful facility to vary the height/length of the mounting, subject to the requirement that the fluid seal means should not be unduly strained. Therefore when in use in a set, the mountings may be selectively filled with gas/liquid to provide a level location of a load module and the relative proportions of gas and liquid may be varied to provide the desired anti-vibration properties.

Preferably the fail-safe retention means comprises at least one surface of part-cylindrical or part-spherical shape to facilitate tilting movement when said shaped surface is contacted by a facing surface of the fluid container or rigid support member in a situation of adverse conditions.

The present invention further provides a module installation comprising a plurality of anti-vibration mountings of the present invention disposed between a load module and support structure and means for selectively varying the quantity and/or pressure of gas in the fluid chamber of each of said mountings.

There is also provided a method of attenuating the transmission of vibration between a support structure and a load module in a changeable operating environment comprising providing between said support structure and load module a plurality of anti-vibration mountings of the present invention arranged to act in parallel and selectively varying the quantity of at least one of the liquid and gas within at least one chamber in response to change of the operating environment.

Figure 2:
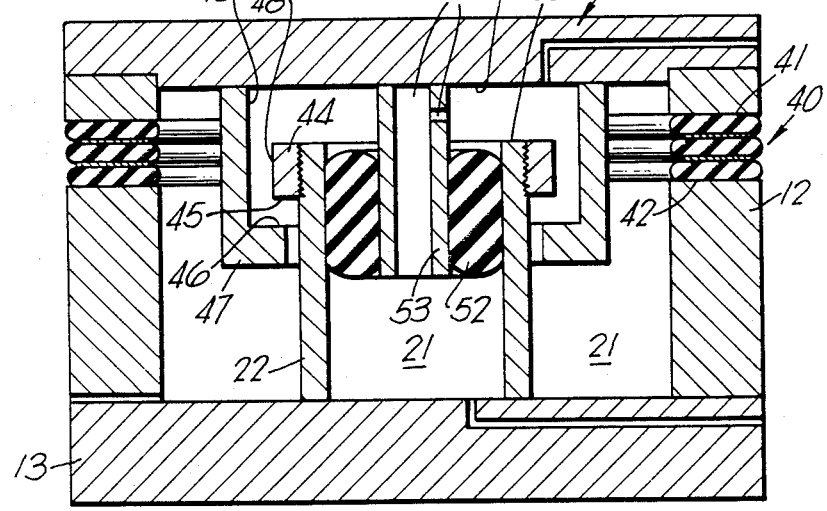

Two embodiments of the present invention will now be described, by way of example, with reference to the accompanying drawings wherein:

FIG. 1 is a sectional view of an anti-vibration mounting in accordance with a first embodiment of the present invention, and FIG. 2 is a sectional view of an anti-vibration mounting in accordance with a second embodiment of the invention.

An anti-vibration mounting for installation between the structure 10 of an offshore drilling rig and a corner region 11 of a personnel accommodation unit comprises a fluid container 12 which is of generally cylindrical form and closed at its lower end portion 13 as viewed in FIG. 1 where the mounting is shown in its intended orientation when in use.

The upper end region 14 of the container 12 is provided with a frusto-conical shaped load bearing surface 15 which confronts, but is maintained spaced from, a similarly shaped surface 16 of a rigid support member 17.

The rigid support member 17 is provided with means (not shown) for its attachment to the corner region 11 of the module, and the lower end portion 13 of the fluid container 12 similarly is provided with means (also not shown) for its attachment to the structure 10.

The confronting surfaces 15,16 extend parallel as viewed in cross-section in FIG. 1 and are maintained spaced by an annular resilient bearing 18 comprising three layers 19 of elastomeric material and two interleaving steel plates 20 each of which plates and layers is of frusto-conical shape. The plates and layers are bonded together and to said surfaces 15 and 16 thereby to form a fluid seal between the container 12 and support member 17. The assembly of the container 12, support member 17 and annular resilient bearing 18 define within the anti-vibration mounting a chamber 21.

The plates and layers of the resilient bearing 18 preferably are angled in the range 10 to 50 degrees, more preferably 20 to 30 degrees, relative to the vertical as viewed in FIG. 1.

A tubular pillar 22 extends within said chamber 21 from the end portion 13 of the container 12 and carries at its upper end an annular stop 23 having a radially outer surface 25 of frusto-conical shape. Said surface is angled so as to confront a similar frusto-conical shaped surface 25 provided at a radially inner region of the ring portion 26 of the support member 17. The maximum diameter of the surface 25 exceeds the minimum diameter of the surface 25 such that the ring 23 serves as a stop to prevent excessive relative movement of the support member 17 in a direction away from the lower end portion 13 of the container 12.

The upper end surface 27 of the ring 23 confronts an inner surface of the central member 28 of the support member 17 and prevents excessive relative movement of the member 17 in a direction towards the end portion 13 of container 12.

To facilitate assembly of the stop means comprising the ring 23, said ring 23 is secured to the pillar 22 subsequent to installation of ring 26. Subsequent to installation of ring 23 the central member 28 of the support member 17 is secured to the ring 26.

The support member 17 is provided with a passage 29 for the flow of gas to and from the chamber 21, and the container 12 is provided with two passages 30,31 for the selectively flow of fluid and/or gas to and from those regions of the chamber 21 lying respectively outwards and inwards of the tubular support 22.

In the aforedescribed construction shown in FIG. 1 the annular bearing 18 restrains sideways movement, i.e. generally horizontal movement, by virtue of its compression resistance, but relatively freely permits vertical movement by shear deflection. The load applied to the anti-vibration mounting is withstood primarily by the pressure of fluid within the chamber 21 and preferably said pressure is adjusted so that under static conditions the annular bearing 18 does not experience any of the vertically applied compression loads.

In a second embodiment of the invention, described with reference to FIG. 2, an anti-vibration mounting comprises a fluid container 12 having a lower end portion 13 and a rigid support member 17. In contrast to the construction of FIG. 1, in the construction of the present embodiment there is provided between the fluid container 12 and support member 17 a resilient annular bearing 40 comprising three layers of rubber interleaved with and bonded to two metal plates disposed such that said layers and plates lie in horizontal planes between generally horizontally disposed and parallel confronting surfaces 41,42 of the support member 17 and container 12 respectively.

A support tube 22 extends from the lower end portion 13 of the container 12 and carries at its upper end a rectangular section stop ring 44, screw-threaded to an outer surface of the tube 22. The ring 44 has a lower surface 45 which in use abuts a confronting surface 46 of an annular stop member 47 associated with the support member 17, and a radially outer surface 48 which in use confronts a radially inner surface 49 of the stop member 47. The confronting surfaces 45,46 restrain excessive relative movement of the support member 17 away from the lower end 13 of cylinder 12, and the confronting surfaces 48,49 restrain excessive relative sideways movement. Excessive relative movement of the member 17 towards end portion 13 is resisted by abutment of the distal end surface 50 of support tube 22 against the inner surface 51 of the support member 17.

The horizontal disposition of the resilient annular layers of the elastomeric material of bearing 14 is such that the bearing provides little resistance to relative sideways movement between the support member 17 and container 12. To provide resistance to sideways movement prior to abutment of the confronting surfaces 48,49 of the stop means an annular rubber bush 52 is provided within the support tube 22 to extend between said tube and central post 53 carried by the support member 17. Post 53 is provided with a through passage 54 to facilitiate flow of fluid between those portions of the chamber 21 lying inwards and outwards respectively of the support tube 22.

What I claim is:

1. An anti-vibration mounting comprising:
a rigid fluid container having an opening:
a rigid support member for closing at least a part of said opening;
confronting surfaces defined respectively by said container and support member;
elastomeric bearing means arranged to accommodate relative movement of the fluid container and support member in a direction towards and away from one another and relative movement in a plane perpendicular to said direction;
said elastomeric bearing means comprising at least one element of elastomeric material arranged as flexible seal means to extend between said confronting surfaces of the fluid container and rigid support member thereby to form a fluid chamber within the anti-vibration mounting;
said fluid chamber containing in part a quantity of liquid and in part a quantity of gas;
fail-safe retention means provided within said chamber and arranged to prevent undue relative separation of the fluid container and rigid support member;
liquid supply means for the flow of liquid to and from said chamber, and
gas supply means for the flow of gas to and from said chamber, said liquid and gas supply means being independent of one another whereby the quantities of said liquid and gas within the chamber may be varied independently by flow through said supply means.

2. An anti-vibration mounting according to claim 1 wherein, at least as considered in cross-section of the mounting, said confronting surfaces extend parallel to one another.

3. An anti-vibration mounting according to claim 1 wherein said at least one element of elastomeric material is secured relative to the support member and container by bonding.

4. An anti-vibration mounting according to claim 1 wherein the orientation of the element of elastomeric material is such that loads applied to the mounting in the direction of compression loading thereof when in normal usage result in a combination of compression and shear loading of the elastomeric material.

5. An anti-vibration mounting according to claim 1 wherein said at least one element of elastomeric material comprises a layer of elastomeric material inclined relative to the direction of compression loading of the mounting when in normal usage.

6. An anti-vibration mounting according to claim 5 wherein the element of elastomeric material comprises a layer of elastomeric material angled in the range 10 degrees to 50 degrees relative to said direction of compression loading.

7. An anti-vibration mounting according to claim 6 wherein said element of elastomeric material is angled in the range 20 degrees to 30 degrees relative to said direction of compression loading.

8. An anti-vibration mounting according to claim 1 wherein there is provided between said confronting surfaces of the fluid container and rigid support member an interleaved arrangement of a plurality of layers of elastomeric material and at least one substantially rigid plate.

9. An anti-vibration mounting according to claim 1 wherein one of said gas and liquid supply means is located in one of the container and rigid support member and the other of said gas and liquid supply means is located in the other of the container and rigid support member.

10. An anti-vibration mounting according to claim 1 wherein the fail-safe retention means comprises at least one surface of part-cylindrical or part spherical shape.

11. An anti-vibration mounting comprising:
a rigid fluid container having an opening:
a rigid support member for closing at least a part of said opening;
confronting surfaces defined respectively by said container and support member;
elastomeric bearing means arranged to accommodate relative movement of the fluid container and support member in a direction towards and away from one another and relative movement in a plane perpendicular to said direction;
said elastomeric bearing means comprising flexible seal means arranged to extend between said confronting surfaces of the fluid container and rigid support member thereby to form a fluid chamber within the anti-vibration mounting;
said fluid chamber containing in part a quantity of liquid and in part a quantity of gas;
said flexible seal means comprising at least two layers of elastomeric material having interleaved therewith and bonded therebetween at least one layer of substantially rigid material, each of said layers of elastomeric material and substantially rigid material being of a frusto-conical shape having an included angle in the range 20 degrees to 100 degrees;
failsafe retention means provided within said chamber and arranged to prevent undue relative separation of the fluid container and rigid support member;
liquid supply means for the flow of liquid to and from said chamber, and
gas supply means for the flow of gas to and from said chamber, said liquid and gas supply means being independent of one another whereby the quantities of said liquid and gas within the chamber may be varied independently by flow through said supply means.

12. An anti-vibration mounting according to claim 11 wherein said included angle is in the range 40 to 60 degrees.

* * * * *